Feb. 3, 1931.     T. J. MULLEN     1,790,830
CONTINUOUS PAPER BEATER
Filed April 20, 1929
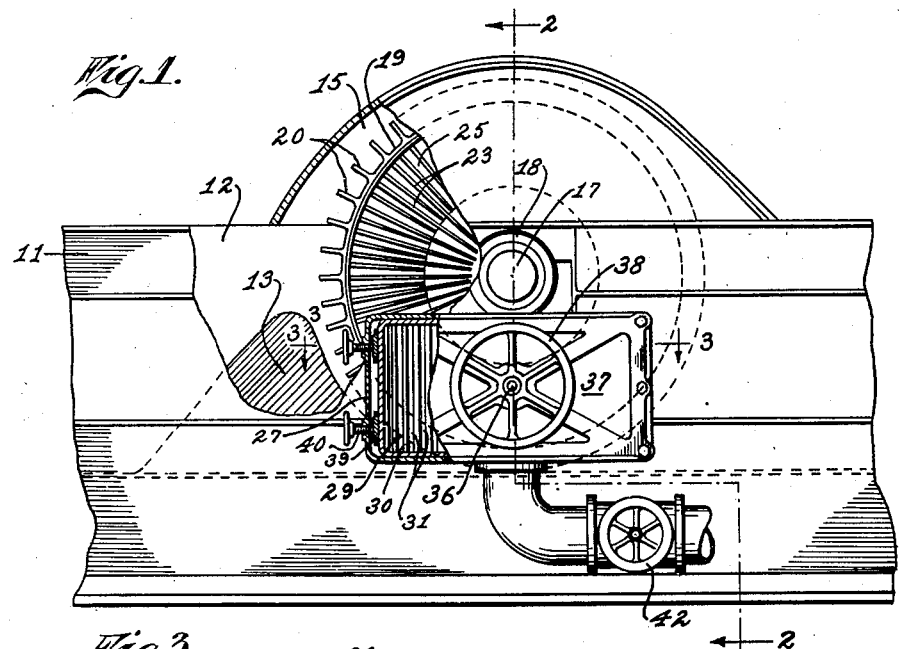
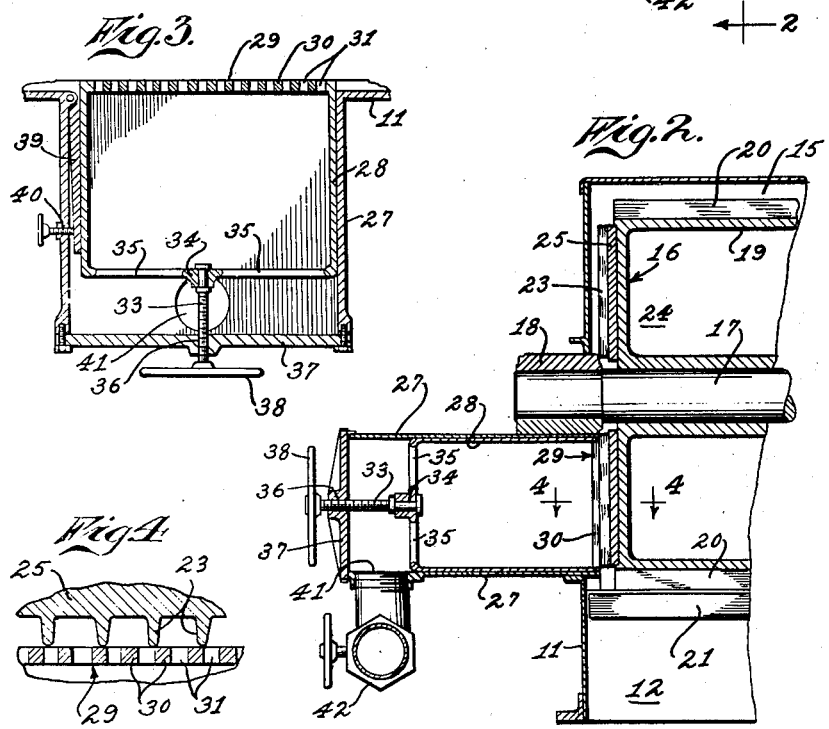
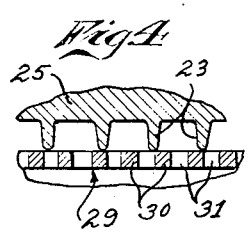
Inventor
Thomas J. Mullen,
By
Attorney Patented Feb. 3, 1931

1,790,830

UNITED STATES PATENT OFFICE

THOMAS J. MULLEN, OF OWENSMOUTH, CALIFORNIA

CONTINUOUS PAPER BEATER

Application filed April 20, 1929. Serial No. 356,820.

My invention relates to a continuous beater and brusher machine for use in the paper making industry.

The broad object of the invention is to provide a machine which beats and brushes the stock therein, these operations ordinarily being performed in separate machines.

A further object of my invention is to provide a combination beater and brusher machine in which the brushed stock is continuously delivered by the machine.

Another object of my invention is to provide a machine of this character in which the beating is accomplished at the periphery of the beating roll, and in which the brushing is accomplished at the side.

Referring to the drawing in which my invention is illustrated:

Fig. 1 is an elevational view partly sectioned.

Fig. 2 is a section taken as indicated by the line 2—2 of Fig. 1.

Fig. 3 is a section taken as indicated by the line 3—3 of Fig. 1.

Fig. 4 is a section taken as indicated by the line 4—4 of Fig. 2.

The form of my invention shown in the drawing is adapted for use in connection with a continuous beater having walls 11 which provide a channel 12. One portion of the channel 12 has a back-fall 13 extending upward from the bottom thereof, and adjacent to the back-fall 13 the channel is enlarged to form a beater drum receiving chamber 15. In the chamber 15 is a beater drum 16 which is horizontally disposed and which is carried by a horizontal rotatable shaft 17. The shaft 17 is rotatably supported by bearings 18 supported by the walls 11 and is rotated by means not illustrated in the drawing.

The periphery 19 of the drum 16 is provided with longitudinal beater bars 20 which are spaced as shown in Fig. 1. These beater bars 20 cooperate with a bed plate 21 disposed in the channel 12 below the beater drum 16, for the purpose of beating the stock.

My invention provides radially disposed brushing bars 23 attached to the end wall 24 of the beater drum 16. In the form of the invention illustrated the brushing bars 23 are formed integral with a plate 25 which is attached to the end wall of the beater drum 16. The brushing bars 23 are proportionately of the shape and spacing shown best in Fig. 4.

The side wall 11 adjacent to the chamber 15 is provided with an opening and connected at this place is a horizontally disposed shell 27, the inner end of which communicates with the chamber 15 at the end of the beater drum 16 to which the brushing bars 23 are secured. Horizontally slidable in the shell 27 is an adjustable frame 28 which consists of a box-like structure. The inner part of the frame 28 is provided in the form of a cutting plate 29 having a series of cutter bars 30 separated by openings 31. The cutter bars 30 are extended vertically so that the bars 30 will be disposed parallel to a brushing bar 23 extending downwardly from the center of the beater drum 16 so that the brushing bars will move across the cutter bars.

In order to permit the cutting plate 29 to be adjusted into proper cutting position with respect to the brushing bars 23, I provide an adjusting screw 33 which is rotatably associated with a hub 34 at the outer end of the frame 28, this hub being supported by arms 35 so that the interior of the frame will not be closed at this outer end. The adjusting screw 33 is threadedly received by a threaded opening 36 formed in an outer wall 37 of the shell 27. The outer end of the adjusting screw has an operating wheel 38. In order to permit the frame to be locked in proper operating position so that the adjusting screw 33 will not be strained I provide a pivoted jib 39 which is pressed against the frame 28 by a clamp screw 40. This will force the frame against the opposite side wall of the shell 27, thus clamping the frame from moving from operating position.

The outer end of the shell 27 has an outlet 41, which is provided with a control valve 42.

In the operation of my invention the channel 12 is filled with stock which consists of pulp and water. The beater drum is set into rotation and the stock is pulled between the beater bars 20 and the bed plate 21. The stock is caused to pass over the back-fall 13 into the left part of the channel 12 shown in Fig. 1. This action creates a suction and causes a circulation of the stock. The purpose of the beater part of the device is to shred or break up the stock into comparatively small pieces. These pieces, however, are not sufficiently small to go to the machines where the paper is formed in a sheet and it is therefore necessary to brush this beaten stock in order to properly refine it. Before the stock has been beaten it is best practice to keep the control valve 52 closed so that no pulp will pass from the machine. However, when the stock has been beaten or at least partly beaten the control valve 42 may be opened to permit the stock to pass from the apparatus.

The cutting plate 29 is adjusted quite close to the brushing bars 23, as illustrated in Fig. 4, in order that the stock will be broken up into shreds sufficiently small to be classified as brushed stock. The operation of the brushing part of the invention is that the stock which has been beaten will pass between the brushing bars 23 and the cutting plate 29 and will be brushed. The brushed stock passes through the openings 31 into the interior of the frame 28. As the brushing action continues this brushed stock passes outward through the outlet 41 to other machines.

By using my machine which performs beating and brushing in the same apparatus, it is possible to better brush the stock in view of the fact that only beaten stock susceptible of being properly brushed will pass through the brushing part of the machine. If the stock is not yet in condition to be brushed it will again pass below the beater drum 16 and if then properly beaten will pass through the brushing apparatus upon its next passage into the chamber 15. Another advantage accruing from the use of my invention is that it is possible to hold the stock more even. This results from the fact that when stock has been properly beaten and is in a condition to be brushed, it will actually pass through the brushing part of the apparatus. A further advantage accruing from my invention is that the brushing bars on the side of the drum 16 cause a better circulation of the stock in the apparatus.

I claim as my invention:

1. A combined beater and brusher machine including: beater means including a beater drum; and brusher means associated with the end of said beater drum.

2. A combined beater and brusher machine including: beater means including a beater drum; and brusher means having brusher bars on the end of said beater drum and a cutting plate cooperating with said brusher bars.

3. A combined beater and brusher machine including: beater means including a beater drum; and brusher means having brusher bars on the end of said beater drum and a cutting plate cooperating with said brusher bars, said cutting plate having an opening through which the brushed stock may pass.

4. A combined beater and brusher machine including: walls forming a channel; a beater means operable in said channel, said beater means including a beater drum; brushing bars on one end of said drum; a shell supported adjacent to said channel and said beater drum; and a cutting plate supported in said shell and cooperating with said brushing bars.

5. A combined beater and brusher machine including: walls forming a channel; a beater means operable in said channel, said beater means including a beater drum; brushing bars on one end of said drum; a shell supported adjacent to said channel and said beater drum; and a cutting plate supported in said shell and cooperating with said brushing bars, said cutting plate having an opening through which brushed stock may pass into said shell.

In testimony whereof, I have hereunto set my hand at Los Angeles, California, this 13th day of April, 1929.

THOMAS J. MULLEN.